United States Patent Office 2,717,255
Patented Sept. 6, 1955

2,717,255

NEW INTERMEDIATES OF THE ANTHRAQUINONE SERIES

Harry Edward Westlake, Jr., Somerville, and William Baptist Hardy, Bound Brook, N. J., assignors to American Cyanamid Company, New York, N. Y., a corporation of Maine No Drawing. Application June 10, 1952, Serial No. 292,714

3 Claims. (Cl. 260—381)

This invention relates to new compounds of the anthraquinone series, and more particularly, it relates to substituted anthraquinones:

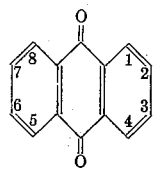

which have a halogen atom in the 1-position, a nitro group in the 2-position, and a second nitro group in either the 5- or the 8-position; and to the derivatives of these compounds in which the nitro substituents have been reduced to amino groups. Such compounds are useful intermediates in the preparation of aminoanthraquinone-1,2-azoles, as will be described later in this application. The use of the aminoanthraquinone-1,2-azoles in the manufacture of dyestuffs, such as thiazole acridines, is described in the copending application of Scalera and Westlake, Serial No. 289,204, filed May 21, 1952, now Patent No. 2,655,502.

We have found that one may nitrate 1-halo 2-nitro-anthraquinone to produce a mixture of only two isomers, namely, 1-chloro-2,5-dinitroanthraquinone and 1-chloro-2,8-dinitroanthraquinone. Since these isomers are similar in their physical and chemical properties, it is not necessary to isolate either compound from the mixture. The reaction product may be reduced directly to the diamino compounds.

The nitration may be carried out by any of the known procedures. We have preferred to use the action of excess nitric acid on a solution of the 1-chlor-2-nitroanthraquinone in sulfuric acid; but other procedures are known to the art and will give the same compound. It is one of the advantages of this method that no other isomers, polynitro compounds, or hydroxy compounds are formed, which are so common in nitrations of chloroanthraquinones. As long as an excess of nitric acid is used, one will get only the dinitro compound.

The reduction of the dinitro compound to the diamino compounds proceeds with great ease. It can be carried out by the action of mild alkaline reducing agents at quite low temperatures. Examples of such reducing agents are the alkali sulfides and hydrosulfides. Care must be taken in choosing conditions that the chlorine is not replaced, since it is highly reactive due to the adjacent β-nitro group.

To utilize these diamines in the preparation of amino azoles, they are acylated. The carbonyl group of the acyl radical introduced in the 2-amino position will eventually become part of the azole ring. Acyl groups which may be introduced by reaction of the diamine with an acyl chloride include alkoyl, aroyl, and heterocyclic carboxyl residues. The acylation is carried out at an elevated temperature in solution in a high-boiling, inert organic solvent, with or without the presence of an acid binding agent. Such an acid binding agent, however, increases the yield. The products are usually isolated by filtration after cooling the reaction mixtures. They are yellow solids.

The utility of our new products now becomes apparent. Since an acyl amino group is present ortho to a chlorine, it is only necessary to convert the chloro derivative to a mercaptan in order to form a thiazole ring on the anthraquinone at this point. Similarly, substitution of hydroxyl for the chlorine will give an oxazole, or substitution of an amino group will give an imidaozle. The main nucleus of the acyl group becomes the μ-substituent in the azole ring thus constructed.

Conversion to thiazoles can be carried out by reaction with sodium disulfide in organic solvents. In many cases the thiazole ring will form immediately in situ, but if it does not, it is easily formed by heating the mixture in sulfuric acid, a procedure necessary in any event, to free the other amino group of the acyl substituent. When the acyl group used is benzoyl, deacylation in sulfuric acid yields phenylthiazoloanthraquinonylamine.

Our invention can be illustrated by the following examples in which the parts are by weight unless otherwise indicated.

EXAMPLE 1

1-chlor-2,5-(8)-dinitroanthraquinone

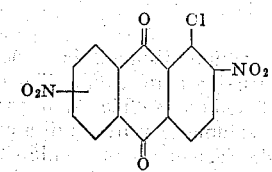

Seven parts of 1-chlor-2-nitroanthraquinone was dissolved in 70 parts by volume of monohydrate. The solution was cooled to 5° C. and four parts of a mixed acid of composition 52% nitric acid and 48% sulfuric acid added gradually while keeping the solution cold. The mixture was allowed to warm to room temperature and stirred until the nitration was complete. The yellow sulfuric acid slurry was drowned and the precipitated 1-chlor-2,5-dinitroanthraquinone and 1-chloro-2,8-dinitroanthraquinone filtered and washed. The yellow product when dry melted at 206–212° C.

EXAMPLE 2

1-chlor-2,5-(8)-diaminoanthraquinone

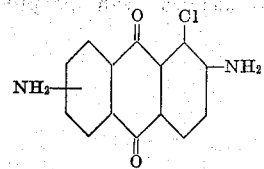

A wet cake from a nitration such as is described in Example 1, containing about 37 parts of both the 1-chlor-2,5-dinitroanthraquinone and 1-chloro-2,5-dinitroanthaquinone, was slurried in 425 parts by volume of water, and 425 parts by volume of 14% solution of sodium hydrosulfide was added with stirring. The slurry was stirred a short time at 40–50° C. and then filtered. The precipitate was washed thoroughly with hot water to remove the small amount of the by-product, 1-mercapto-2,5-diaminoanthraquinone. The isomeric mixture of 1-chloro-diaminoanthraquinones so produced melted at 258–261° C. and was a red solid.

EXAMPLE 3

*1-chlor-2,5-(8)-dibenzoylaminoanthraquinone*

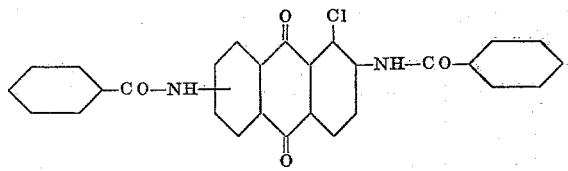

This and the following examples illustrate the utilization of our invention to prepare an axole. Forty parts of 1-chlor-2,5-(8)-diaminoanthraquinone was stirred with 213 parts by volume of nitrobenzene, 26.5 parts by volume of benzoylchloride, and 4 parts by volume of pyridine, at 120° C. until acylation was complete. The mixture was then cooled to room temperature and the precipitated 1-chlor - 2,5 - (8)-dibenzoylaminoanthraquinone was isolated by filtration. The cake was washed with nitrobenzene and alcohol, and dried.

EXAMPLE 4

*5-(8)-benzoylamino-1,2-phenylthiazoloanthraquinone*

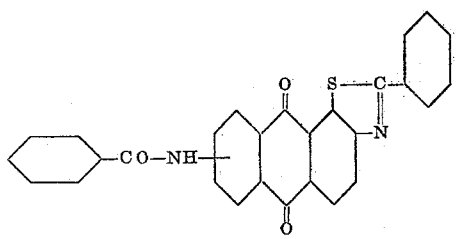

A solution of sodium disulfide in aqueous pyridine was prepared by stirring and heating 37.5 parts of pyridine, 8.5 parts of sodium sulfide, 2.28 parts of sulfur, and 6.25 parts by volume of water until a complete solution was obtained. Ten parts of 1-chlor-2,5-(8)-dibenzoylaminoanthraquinone was added and the mixture stirred at 90–100° C. until no starting material was detectable. The yellow-green slurry was drowned in water and the product isolated by filtration. The green-yellow solid can be recrystallized from nitrobenzene.

EXAMPLE 5

*5-(8)-benzoylamino-1,2-phenylthiazoloanthraquinone*

A solution of sodium bisulfide in alcohol was prepared by stirring and heating five parts sodium sulfide crystals, 0.67 part sulfur and 150 parts by volume of alcohol until a complete solution was obtained. Five parts of 1-chlor-2,5-(8)-dibenzoylaminoanthraquinone was then added and the mixture stirred and heated at reflux until the starting material was no longer detectable. The mixture was drowned in water and the precipitate isolated by filtration. It was identical with the product obtained from Example 4.

EXAMPLE 6

*5-(8)-amino-1,2-phenylthiazoloanthraquinone*

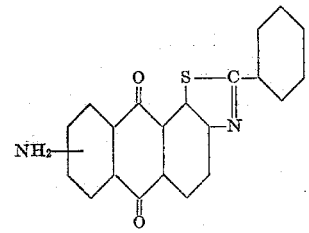

Two parts of 5-(8)-benzoylamino-1,2-phenylthiazoloanthraquinone was heated in concentrated sulfuric acid to 85° C. The solution was drowned in water and the precipitated free amine isolated by filtration. It was a red solid with a melting point, when dry, of approximately 328° C.

We claim:

1. Compounds having the formula:

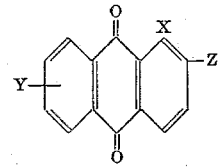

in which X is a halogen, and Y is an α-substituent selected from the class consisting of $NO_2$ and $NH_2$ groups, and Z is the same radical as Y.

2. Compounds having the formula:

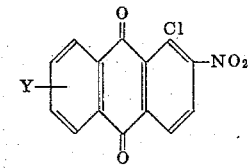

in which Y is an α-nitro group.

3. Compounds having the formula:

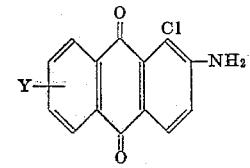

in which Y is an α-amino group.

References Cited in the file of this patent

FOREIGN PATENTS

| | | |
|---|---|---|
| 5,018 | Great Britain | of 1899 |
| 173,166 | Great Britain | Dec. 29, 1921 |